(12) United States Patent
Egashira et al.

(10) Patent No.: US 9,695,338 B2
(45) Date of Patent: Jul. 4, 2017

(54) DECORATIVE SHEET CONTAINING A POLYURETHANE LAYER AND STRUCTURE

(71) Applicant: 3M INNOVATIVE PROPERTIES COMPANY, St. Paul, MN (US)

(72) Inventors: Ken Egashira, Kanagawa (JP); Hiroshi Sakaguchi, Tokyo (JP); Hiroki Wakamatsu, Hadano (JP); Tomotaka Araki, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 20 days.

(21) Appl. No.: 14/400,078

(22) PCT Filed: May 15, 2013

(86) PCT No.: PCT/US2013/041090
§ 371 (c)(1),
(2) Date: Nov. 10, 2014

(87) PCT Pub. No.: WO2013/173424
PCT Pub. Date: Nov. 21, 2013

(65) Prior Publication Data
US 2015/0111012 A1 Apr. 23, 2015

(30) Foreign Application Priority Data
May 16, 2012 (JP) .................................. 2012-112502

(51) Int. Cl.
| | |
|---|---|
| C09J 7/02 | (2006.01) |
| B44C 1/20 | (2006.01) |
| B32B 27/40 | (2006.01) |
| C08G 18/66 | (2006.01) |
| C08G 18/75 | (2006.01) |
| C08G 18/79 | (2006.01) |
| C08G 18/08 | (2006.01) |
| C09D 175/06 | (2006.01) |
| C08G 18/44 | (2006.01) |

(52) U.S. Cl.
CPC ............. *C09J 7/0296* (2013.01); *B32B 27/40* (2013.01); *B44C 1/20* (2013.01); *C08G 18/0823* (2013.01); *C08G 18/44* (2013.01); *C08G 18/6659* (2013.01); *C08G 18/758* (2013.01); *C08G 18/797* (2013.01); *C09D 175/06* (2013.01); *C09J 7/0282* (2013.01); *B32B 2451/00* (2013.01); *C09J 2201/122* (2013.01); *C09J 2201/16* (2013.01); *C09J 2400/163* (2013.01); *C09J 2475/006* (2013.01); *Y10T 428/24802* (2015.01); *Y10T 428/24917* (2015.01); *Y10T 428/28* (2015.01); *Y10T 428/2848* (2015.01); *Y10T 428/2878* (2015.01); *Y10T 428/2883* (2015.01); *Y10T 428/2891* (2015.01); *Y10T 428/2896* (2015.01)

(58) Field of Classification Search
CPC ................ C08G 18/12; C08G 18/3225; C08G 18/0823; C08G 18/44; C08G 18/6659; C08G 18/758; C08G 18/797; C09D 175/06; C09J 2201/122; C09J 2201/16; C09J 2400/163; C09J 2475/006; C09J 7/0282; C09J 7/0296; B32B 2451/00; B32B 27/40; B44C 1/20; Y10T 428/24802; Y10T 428/24927; Y10T 428/28; Y10T 428/2848; Y10T 428/2878; Y10T 428/2883; Y10T 428/2891; Y10T 428/2896; Y10T 428/31554; Y10T 428/31562; Y10T 428/31565; Y10T 428/3158; Y10T 428/31583; Y10T 428/31587
USPC ......... 428/423.3, 423.5, 423.7, 424.2, 424.4, 428/424.6; 427/372.2, 385.5
See application file for complete search history.

(56) References Cited

U.S. PATENT DOCUMENTS

| | | |
|---|---|---|
| 6,652,983 B1 | 11/2003 | Mori |
| 7,666,497 B2 | 2/2010 | Takatsuki |
| 2002/0001723 A1 | 1/2002 | Fuchs |
| 2008/0166485 A1* | 7/2008 | Steenwinkel et al. ...... 427/385.5 |
| 2010/0216905 A1* | 8/2010 | Kuwamura et al. .......... 521/170 |
| 2014/0295181 A1* | 10/2014 | Minomo et al. .............. 428/354 |

FOREIGN PATENT DOCUMENTS

| | | |
|---|---|---|
| EP | 1318011 | 6/2003 |
| JP | 64-88079 | 4/1989 |
| JP | 05-155976 | 6/1993 |
| JP | 2002-302526 | 10/2002 |
| JP | 2004002825 | 1/2004 |
| JP | 2004-322540 | 11/2004 |
| JP | 3851523 | 11/2006 |
| JP | 2006-341388 | 12/2006 |
| JP | 2007154352 | 6/2007 |

(Continued)

OTHER PUBLICATIONS

International Search Report for PCT International Application No. PCT/US2013/041090 mailed on Jul. 30, 2013, 4 pages.

*Primary Examiner* — Thao T Tran

(57) ABSTRACT

In a decorative sheet including a surface layer and an adhesion layer, the surface layer is a polyurethane layer obtained by crosslinking using a curing agent and coating and drying of a straight chain polyurethane resin having a specified molecular weight and acid value, the polyurethane resin being obtained by reaction of a diamine chain extender agent with a polyurethane prepolymer obtained by reaction of a polycarbonate diol having an alicyclic structure, an aliphatic diol having a carboxyl group, and 4,4'-cyclohexylmethandiisocyanate.

14 Claims, No Drawings

(56) References Cited

FOREIGN PATENT DOCUMENTS

| | | |
|---|---|---|
| JP | 2008155560 | 7/2008 |
| JP | 2008-246693 | 10/2008 |
| JP | 2009023144 | 2/2009 |
| JP | 2010-131901 | 6/2010 |
| JP | 2010-260942 | 11/2010 |
| JP | 2011-121308 | 6/2011 |
| WO | WO 03/049942 A1 | 6/2003 |
| WO | WO 2005/120830 | 12/2005 |
| WO | 2009/149035 | 12/2009 |
| WO | WO 2009-145242 | 12/2009 |
| WO | 2010/084871 | 7/2010 |
| WO | 2010/098316 | 9/2010 |
| WO | 2010/098317 | 9/2010 |
| WO | 2011/043342 | 4/2011 |
| WO | 2011/081994 | 7/2011 |
| WO | WO 2012/026475 | 3/2012 |
| WO | WO 2013-003428 | 1/2013 |
| WO | WO 2013-151745 | 10/2013 |

\* cited by examiner

DECORATIVE SHEET CONTAINING A POLYURETHANE LAYER AND STRUCTURE

CROSS REFERENCE TO RELATED APPLICATIONS

This application is a national stage filing under 35 U.S.C. 371 of PCT/US2013/041090, filed May 15, 2013, which claims priority to JP Patent Application No. 2012-112502, filed May 16, 2012, the disclosures of which are incorporated by reference in their entirety herein.

FIELD OF INVENTION

The present invention relates to a decorative sheet and to a unified structure formed by thermoforming of the decorative sheet and a substrate.

BACKGROUND ART

Attachment of a decorative sheet (e.g., an adhesive-backed paint replacement film) or protective film (e.g., an adhesive-backed paint protection film) is known as a means for decorating and/or protecting an internal or external surface of a vehicle such as, e.g., an automobile, train, airplane, watercraft, or the like.

For example, Japanese Unexamined Patent Application Publication No. 2010-260942 describes a multilayer film capable of attachment by accommodating numerous surface shapes, that has good curved surface followability, and that has excellent durability after attachment, where the multilayer film includes a surface protection layer formed from a surface protection film and a metal thin film layer. Based on a thermoplastic straight-chain molecular weight structure in the polyurethane of the surface protection layer, a branched structure is appropriately arranged by branching by crosslinking. Thus, due to the use of cyclohexane in the backbone of the molecule, high moldability and weather resistance are both realized. In order to handle as a coatable liquid the polyurethane having a molecular weight of at least several tens of thousands, the polyurethane is used as an aqueous dispersion, i.e. an aqueous polyurethane dispersion (PUD).

A decorative sheet (e.g., an adhesive-backed paint replacement film) used for vehicle applications, such as for an automobile, train, airplane, watercraft, or the like, is required to have decorative performance (i.e. multiple colors, patterns, textures, or the like) and simultaneously to have water resistance and alcohol resistance, particularly when used for exterior decoration. That is to say, when the decorative sheet has been exposed to rain for a long time period, peeling, swelling, discoloration, or the like failures must not occur when alcohol-containing window washer, water repellant, or other chemicals become attached to the decorative sheet. However, since water dispersed polyurethanes generally have good hydrophilicity, the polyurethane is readily permeated by water and alcohol. As a result, water resistance and alcohol resistance of the polyurethane are low. When a surfactant is jointly used in a top layer for exterior use in order to blend in a photostabilizer, UV absorbent, or the like for weather resistance of the top layer itself or for protection of a lower layer, hydrophilicity increases further, and resistance becomes inferior. Thus, the film is required to have even greater water resistance and alcohol resistance.

SUMMARY OF THE INVENTION

An object of the present invention is to provide a decorative sheet and a structure capable of any one or combination of attachment by accommodating numerous surface shapes, and being excellent in water resistance, alcohol resistance, and/or weather resistance.

In one aspect of the present invention, a decorative sheet is provided that includes a surface layer and an adhesion layer. The surface layer is a polyurethane layer obtained by crosslinking using 0.1 to 2.0 equivalents of a curing agent per acid value of carboxyl groups, and coating and drying of a straight chain polyurethane resin obtained by reaction of a diamine chain extender agent with a polyurethane prepolymer obtained by reaction of a polycarbonate diol having an alicyclic structure, an aliphatic diol having a carboxyl group, and an isocyanate including 4,4'-cyclohexylmethandiisocyanate. The molecular weight of the straight chain polyurethane resin is in the range of from about 50,000 to 550,000. The acid value of the straight chain polyurethane resin is in the range of from about 20.0 to about 30.0 mg·KOH/g.

In another aspect of the present invention, a structure is provided that is formed by thermoforming or coextrusion of the decorative sheet and a substrate.

In an addition aspect of the present invention, a method is provided for making a decorative sheet comprising a surface layer and an adhesion layer, with the surface layer being a polyurethane layer. The polyurethane is obtained by providing a straight chain polyurethane resin obtained by reacting a diamine chain extender agent with a polyurethane prepolymer, where the polyurethane prepolymer is obtained by reaction of a polycarbonate diol having an alicyclic structure, an aliphatic diol having a carboxyl group, and an isocyanate including 4,4'-cyclohexylmethandiisocyanate. The straight chain polyurethane resin is crosslinked using 0.1 to 2.0 equivalents of a curing agent per acid value of carboxyl groups. The crosslinked straight chain polyurethane resin is coated onto a surface (e.g., a casting liner), and the coated crosslinked straight chain polyurethane resin is dried. The molecular weight of the straight chain polyurethane resin is in the range of from about 50,000 to about 550,000, and the straight chain polyurethane resin exhibits an acid value in the range of from about 20.0 to about 30.0 mg·KOH/g.

According to the present invention, it is possible to provide a structure and a decorative sheet capable of at least one or any combination of attachment by accommodation of numerous types of surface shapes and having excellent water resistance, alcohol resistance, and/or weather resistance.

DETAILED DESCRIPTION OF THE INVENTION

The decorative sheet of the present invention includes as essential constituents a surface layer and an adhesion layer.

The role of the surface layer is to protect the surface of the decorative sheet, to more clearly show a design (i.e. pattern or color), or the like. The surface layer is a polyurethane layer obtained by crosslinking using 0.1 to 2.0 equivalents of a curing agent per acid value of carboxyl groups, and coating and drying of a straight chain polyurethane resin obtained by reaction of a diamine chain extender agent with a polyurethane prepolymer obtained by reaction of a polycarbonate diol having an alicyclic structure, an aliphatic diol having a carboxyl group, and an isocyanate including 4,4'-cyclohexylmethandiisocyanate; molecular weight of the straight chain polyurethane resin being 50,000 to 350,000; and acid value of the straight chain polyurethane resin being 20.0 to 30.0 mg·KOH/g.

Here, the term "polycarbonate diol" refers to a compound that has one hydroxyl group each at either end of a polymer chain formed by connection of carbonate bonds. The term "polycarbonate diol having an alicyclic structure" refers to a polycarbonate diol that has at least one alicyclic structure within the polycarbonate diol molecule.

Polycarbonate diols having an alicyclic structure are exemplified by a polycarbonate diol synthesized from 1,4-cyclohexanedimethanol and 1,6-hexanediol, specifically such as ETERNACOLL UM90 manufactured by Ube Industries, Ltd.

The aliphatic diol having a carboxyl group is exemplified by 2,2-dimethylolpropionic acid, 2,2-dimethylolbutyric acid, 3,3-dimethylolpropionic acid, or the like.

The term "isocyanate including 4,4'-cyclohexylmethandiisocyanate" is taken to mean an isocyanate that includes 4,4'-cyclohexylmethandiisocyanate as an isocyanate component. The amount of the 4,4'-cyclohexylmethandiisocyanate included is not particularly limited, and for example, may be greater than or equal to 30 percent by weight, or greater than or equal to 50 percent by weight.

The polyurethane prepolymer can be obtained by publicly known methods by reaction of the polycarbonate diol having an alicyclic structure, the aliphatic diol having a carboxyl group, and the isocyanate including 4,4'-cyclohexylmethandiisocyanate.

Preferred combinations of diols and isocyanates composing the polyurethane prepolymer are exemplified by polycarbonate diols synthesized by ester exchange of 1,4-cyclohexanedimethanol and 1,6-hexanediol with ethylene carbonate and 2,2-dimethylolpropionic acid as the diols, combined with 4,4'-cyclohexylmethanediisocyanate as the isocyanates.

The straight chain polyurethane resin is obtained by production of the polyurethane prepolymer, and then by reaction of the obtained prepolymer with a diamine chain extender agent. The utilized diamine chain extender agent is exemplified by publicly known diamine type compounds such as ethylenediamine, propylenediamine, putrescine or the like.

In the process of production of the straight chain polyurethane resin, or during blending of the crosslinking agent, a publicly know additives may be added such as a photostabilizer, UV absorbent, pH adjusting agent, surfactant, water, or the like.

Molecular weight of the straight chain polyurethane resin is 50,000 to 550,000, and acid value of the straight chain polyurethane resin is 20.0 to 30.0 mg·KOH/g. Or molecular weight of the straight chain polyurethane resin is 50,000 to 350,000, and acid value of the straight chain polyurethane resin is 20.0 to 30.0 mg·KOH/g. Whitening and luster are maintained when being within these numerical ranges, and a decorative sheet may be obtained that has excellent water resistance and alcohol resistance.

Further, the straight chain polyurethane resin preferably has a molecular weight of 80,000 to 300,000, and preferably has an acid value of 25.0 to 29.4 mg·KOH/g. Further, a value of formula (1) below indicating the relationship between the molecular weight and the acid value is preferably less than or equal to 25, less than or equal to 19, or less than or equal to 13. Or the straight chain polyurethane resin preferably has a molecular weight of 80,000 to 300,000, and preferably has an acid value of 25.0 to 29.4 mg·KOH/g. Further, the relationship between the molecular weight and the acid value, as indicated by the value of the below formula (1), is preferably less than or equal to 25, less than or equal to 19, or less than or equal to 13.

$$[(300{,}000-\text{molecular weight})/50{,}000]^2 + (\text{acid value}-25)^2 \quad (1)$$

A decorative sheet having more excellent water resistance and alcohol resistance may be obtained when this value is less than or equal to 19.

Here, the term "molecular weight" refers to the weight average molecular weight measured after aging of a polyurethane dispersion for 3 hours at 60° C. Molecular weight may be controlled by setting the ratio of diol to isocyanate. Since polymerization occurs in a linear manner by the diol and isocyanate alternatingly bonding to one another, a high molecular weight is obtained in the composition range in which a near equivalent amount or excess of the isocyanate is blended, in a molecule that actually contributes to the reaction. By further fine adjustment of the blend, and by reaction together of the diol and isocyanate, the proportion of molecules having remnant isocyanate groups at both ends of the prepolymer becomes high. Thus, a relatively high molecular weight prepolymer may be obtained by further increase of molecular weight using a chain extender agent. Temperature control is used during aqueous dispersion. That is to say, by maintaining a low temperature, reaction between isocyanate and water is prevented, and high molecular weight may be ensured by use of the chain extender agent. Since growth of the long linear molecule occurs by alternatingly connecting together prepolymer and diamine chain extender agent molecules, a high molecular weight polyurethane is obtained by suitable blending of the prepolymer and diamine chain extender agent so that neither is in excess.

Here, the term "acid value" refers to the concentration of carboxyl groups obtained by the use of a KOH-EtOH standard solution to titrate the polyurethane dispersion diluted in an organic solvent. Acid value may be controlled by the blending fraction of carbonyl group-containing diols in the diol. That is to say, acid value increases as the fraction of carbonyl-group containing diol increases. When acid value is excessively high, weather resistance and moldability (originating from polycarbonate diol including a cyclohexane structure) are impaired, hydrophilicity increases, and there is danger of worsening of water resistance and alcohol resistance. An excessively low acid value has problems such as an inability to obtain water dispersability and storage stability, an inability to set the required frequency of branched structures by reaction with the crosslinking agent, and a worsening of weather resistance and water resistance.

It can be desirable for the surface layer to be substantially free of plasticizers. The expression "substantially free of plasticizers" indicates that no plasticizer is contained at all, or alternatively, that a trace amount of plasticizer is contained at a concentration such that there is no expression of the function as a plasticizer. If a plasticizer is included, there is a trend for stress to decrease and for fracture elongation to become high. The plasticizer can refer to publicly known plasticizers and particularly not limited, and specific examples of the plasticizer include di(2-ethylhexyl)fumarate, dioxtyl adipate, or the like.

The surface layer is obtained by crosslinking using 0.1 to 2.0 equivalents of a curing agent per acid value, and coating and drying of the polyurethane resin obtained in the aforementioned manner. Coating and drying may be performed by conventional publicly known methods. Such methods include coating on a liner or the like by knife coating, bar coating, blade coating, doctor coating, roll coating, cast coating, or the like, and as may be required, heating and drying. A polyolefin film (e.g. polyester or the like), or a plastic film (e.g. polyethylene terephthalate (PET) film, or the like) may be used as the liner (i.e. release paper). Alternatively, the surface layer may be formed by coating and drying of the polyurethane resin upon the adhesive layer included in the decorative sheet and the below described any constituents (i.e. design layer, bonding layer, or the like).

Conventional publicly known curing agents that react with the carboxyl group may be used as the curing agent. Specific examples of the curing agent can include polycarbodiimide, aziridine, oxazoline, or the like.

No particular limitation is placed on thickness of the surface layer, and this thickness, for example, may be greater than or equal to approximately 5 μm, greater than or equal to approximately 10 μm, or greater than or equal to approximately 25 μm; and less than or equal to approximately 500 μm, less than or equal to approximately 200 μm, or less than or equal to approximately 100 μm.

The adhesion layer is a layer comprising a pressure-sensitive adhesive or heat-sensitive adhesive, or alternatively, is a layer comprising a resin capable of fusion with a thermal fusion substrate resin forming the decorative sheet adherend. Acrylic type adhesives may be cited as the pressure-sensitive adhesive. Acrylic type adhesives, polyurethane type adhesives, polyester type adhesives, and polyamide type adhesives may be cited as the heat-sensitive adhesive.

The fusion capable resin is exemplified by polyolefin resins such as ABS resin, polypropylene, or the like, and by polyvinyl chloride (PVC) resin, or the like.

The adhesion layer may be selected appropriately according to the material of the substrate forming the decorative sheet adherend. For example, if the adherend is ABS resin, an acrylic type pressure-sensitive adhesive, acrylic type heat-sensitive adhesive, polyurethane type heat-sensitive adhesive, or ABS resin film may be used as the adhesion layer. If the adherend is isocyanate type primer-treated ABS, for example, acrylic type heat-sensitive adhesive or polyurethane type heat-sensitive adhesive may be used as the adhesion layer. If the adherend is polycarbonate (PC) resin, for example, polyurethane type heat-sensitive adhesive may be used as the adhesion layer. If the adherend is acrylic type primer-treated stainless steel, for example, polyurethane type heat-sensitive adhesive or polyester type heat-sensitive adhesive may be used as the adhesion layer. If the adherend is a polyurethane resin, for example, polyurethane type heat-sensitive adhesive or polyamide type heat-sensitive adhesive may be used as the adhesion layer. If the substrate material is a polyolefin, for example, a polyolefin film may be used as the adhesion layer. If the adherend is a modified polyolefin type primer-treated polyolefin, for example, an acrylic type heat-sensitive adhesive or polyurethane type heat-sensitive adhesive may be used as the adhesion layer. If the adherend is PVC, for example, a PVC film may be used as the adhesion layer.

The decorative sheet may further include a design layer subsequent to the surface layer, as an optional constituent.

The term "design layer" refers to a layer that provides visual appearance as exemplified by metallic coloration, decorative coloration, pattern, or the like.

If there is a desire to provide metallic coloration, it is possible to use, for example, indium vapor deposition, tin vapor deposition, chromium vapor deposition, aluminum vapor deposition, or a layer that has been finely coated by vapor deposition of such metals. It is also possible to use a metallic layer comprising an aluminum flake coating, aluminum foil, stainless steel foil, or the like. Among such means to provide metallic coloration, an indium vapor deposited layer can be preferably used.

If there is a desire to provide a coating color, a color layer may be used that presents metallic coloration or the like.

Pigments that may be used for the color layer by dispersion in a binder resin are exemplified by inorganic pigments such as titanium oxide, carbon black, chrome yellow, yellow iron oxide, colcothar, red iron oxide, or the like; organic pigments such as phthalocyanine pigments (phthalocyanine blue, phthalocyanine green, or the like), azo lake pigments, indigo pigments, perinone pigments, perylene pigments, quinophthalone pigments, dioxazine pigments, quinacridone type pigments (quinacridone red, or the like), or the like; aluminum brightening agents such as aluminum flake, vapor-deposited aluminum flake, metal oxide-coated aluminum flake, colored aluminum flake, or the like; and pearlescent brightening agents such as flake-like mica and synthetic mica coated with a metal oxides such as titanium oxide or iron oxide, or the like.

If there is a desire to provide a pattern, a pattern layer may be used that imparts to the structure a pattern such as wood grain, and marble grain or imparts a logo, image, or the like.

As the pattern layer, it is possible to use a film, sheet, metal foil, or the like that has a printed pattern.

No particular limitation is placed on thickness of the design layer. For example, the thickness may be greater than or equal to approximately 5 μm, or greater than or equal to approximately 10 μm; and may be greater than or equal to approximately 10 μm, and less than or equal to approximately 300 μm, less than or equal to approximately 200 μm, or less than or equal to approximately 100 μm. Alternatively, if a metal layer is used as the design layer, thickness of the design layer may be greater than or equal to approximately 0.001 μm, or may be greater than or equal to approximately 0.005 μm, and may be greater than or equal to approximately 0.01 μm, and less than or equal to approximately 0.5 μm, or less than or equal to approximately 0.1 μm, or less than or equal to approximately 0.05 μm.

The decorative sheet may also include a bonding layer for bonding the adhesion layer to the surface layer or the design layer (i.e. optional constituent).

A layer comprising publicly known acrylic resins, polyurethane resins, polyester resins, polyamide resin, or the like may be used as the bonding layer. The bonding layer, for example, may be obtained by the method of coating (using a knife coater, bar coater, blade coater, doctor coater, roll coater, case coater, or the like), and as may be required, heating and drying. A polyolefin film (e.g. polyester or the like), or a plastic film (e.g. polyethylene terephthalate (PET) film, or the like) may be used as the liner. The bonding layer formed on the liner may be laminated by lamination on the adjacent surface layer or design layer.

Alternatively, the bonding layer may be obtained by coating and drying in the same manner to the adjacent layers, i.e. the surface layer, design layer, or the like. If the design layer is a metal vapor-deposited film, the surface of the metal vapor-deposited film is extremely fragile, and thus coating of the bonding layer upon the vapor-deposited metal is difficult. This method of coating and drying makes lamination easier.

The bonding layer may further include a silicone or silane coupling agent. Inclusion of a silicone or silane coupling agent in the bonding layer means using a bonding layer in which a silicone or silane coupling agent is intermixed with the constituent resin, or means that there is a thin film that includes silicone in the resin layer surface due to coating and transfer of silicone to the surface of a previously formed resin layer.

The term "silicone" refers to a polymeric compound having a polysiloxane structure, and the silicone is used in order to adjust surface energy of the coating film, to obtain high heat resistance, or the like. Commercially available liquid additives are exemplified by BYK 315 methylalkylpolysiloxane, BKY 374 polydimethylsiloxane (both manufactured by BYK Chemie GmbH), or the like. In the silane coupling agent, a functional group (e.g. methoxy group or ethoxy group) that readily bonds to an inorganic substance as well as a functional group (e.g. amino group, epoxy group, or mercapto group) that readily bonds to an organic substance are both bonded to the silicon atom, so that the silane coupling agent is used for bonding together an inorganic substance and an organic substance. Commercially available silane coupling agents include KBM-903: 3-aminopropyltrimethoxysilane, KBE-9103: 3-triethoxysilyl-N-1,3-dimethyl-butylidene-propylamine, KBE-9007: 3-isocyanate propyltriethoxysilane (all manufactured by Shin-Etsu Silicone), or the like. The bonding layer solution is blended prior to coating by the silane coupling agent. For example, after coating of the bonding layer on the adhesion layer using a bar coater or the like, a coating film of approximately 0.02 mm thickness is formed by drying for 3 minutes at 80° C., and the coating film is laminated on the vapor-deposited metal surface. The film integrated in this manner has excellent alcohol resistance. A film produced without blending of a silicone or a silane coupling agent, when immersed for 0.5 h in methanol and then removed, appears to have whitened when viewed from the surface side. In contrast, a film containing the blended silicone or silane coupling agent has no whitening or has a reduced degree of whitening. If a silicone is blended, and when the blended amount of silicone is small, the post alcohol-immersion whitening preventing effect becomes inferior. When the blended amount of silicone is high, failures readily occur such as peeling at the laminate interface during immersion in alcohol. The solids-basis blended amount of silicone per 100 parts of adhesive, for example, may be from approximately 0.1 to approximately 1.8, from approximately 0.2 to approximately 1.6, or from approximately 0.3 to approximately 1.4. If a silane coupling agent is blended, and when the blended amount of silane coupling agent is small, the post alcohol-immersion whitening preventing effect becomes inferior. When the blended amount of silane coupling agent is high, failures readily occur such as peeling at the laminate interface during immersion in alcohol. The solids-basis blended amount of the silane coupling agent per 100 parts of adhesive, for example, may be from approximately 0.2 to approximately 4, from approximately 0.7 to approximately 4, or from approximately 1.5 to approximately 3. When the value of Formula (1) of the combined surface layer at this time is less than or equal to 19, or is less than or equal to 13, alcohol resistance may be more effectively realized.

As another embodiment, a bonding layer solution containing neither silicone nor silane coupling agent is coated, for example, by a bar coater or the like on an adhesion layer. Thereafter, the coating film is dried under drying conditions (e.g. 3 minutes at 80° C.) to form a coating film of approximately 0.02 mm thickness. Thereafter, the coating film is laminated on a metal vapor-deposited surface previously pressed to a silicone rubber surface. The integrated film formed in this manner has excellent alcohol resistance. After immersion of this film in methanol for 0.5 h and then removal from the methanol, whitening is not observed when seen from the surface side, or the degree of whitening is decreased. When the vapor-deposited metal surface is subjected to elemental analysis after pressing to the silicone rubber, silicon content is found to be 7.3 percent. Silicon could not be found in the vapor-deposited metal surface prior to pressing to the silicone rubber, and after pressing to the another material (i.e. PET film or stainless steel), and alcohol resistance is not expressed. Based on these facts, it is thought that a similar effect is obtainable even for a non-silicone rubber substance as long as the substance includes silicon and has the properties of being able to transfer such silicon.

No particular limitation is placed on thickness of the bonding layer. For example, thickness of the bonding layer may be greater than or equal to approximately 5 µm, or greater than or equal to approximately 10 µm, or greater than or equal to approximately 10 µm, and less than or equal to approximately 300 µm, less than or equal to approximately 200 µm, or less than or equal to approximately 100 µm.

The decorative sheet of the present invention may be manufactured by conventional publicly known methods. For example, polyurethane resin may be coated and dried on a liner to produce the surface layer, then indium vapor deposition is used on the surface layer. An adhesion layer obtained by coating and drying adhesive on a separately prepared liner may be laminated to obtain a decorative sheet that has a 5 layer structure. As may be required, a bonding layer may also be provided by publicly known methods.

A vehicle may be decorated by use of the decorative sheet of the present invention on interior-exterior components of the vehicle. In particular, even when the vehicle component has a three-dimensional structure, decoration of the component with the desired color, pattern, and texture is possible. Simultaneously, water resistance, alcohol resistance, and weather resistance are excellent.

The structure of the present invention may be formed by thermoforming using the decorative sheet and the substrate, or may be formed by coextrusion.

The substrate becomes the adherend of the decorative sheet and is a substrate used as a component of a vehicle such as an automobile or the like. Examples of the substrate include ABS resin, polycarbonate, stainless steel, polyurethane resin, polyolefin resin, polyvinyl chloride resin, or the like. Such substrates may have various shapes such as flat, three-dimensionally structured shapes, or the like.

The term "thermoforming" refers to a method of pressure bonding, gluing, or fusing the decorative sheet to the substrate while forming and applying heat by vacuum-pressure forming, vacuum forming, injection molding, hot press forming, or the like; or alternatively, thermoforming means a method of pressure bonding or gluing previously a forming sheet to the substrate and then performing forming and integration by the application of heat. The term "coextrusion" refers to a method of coextrusion of the decorative sheet and substrate. These forming methods may be performed by conventional publicly known equipment and processes. The substrate and the decorative sheet of the present invention are formed by this forming method and may be used to obtain a structure (vehicle component) that has the desired shape, pattern, and texture.

The obtained structure has excellent water resistance, alcohol resistance, and weather resistance. For example, even when the obtained structure is subjected to severe conditions such as long term immersion in hot water or the like, there is neither whitening nor decline of gloss, and clear appearance may be maintained.

The following abbreviations are used in the present specification.
KOH: Potassium hydroxide
EtOH: Ethanol
PET: Polyethylene terephthalate
MDI: Methane diisocyanate HDI: Hexamethylene diisocyanate
IPDI: Isophorone diisocyanate
H12MDI: 4,4'-cyclohexylmethane diisocyanate
PVC: Polyvinyl chloride resin
MEK: Methyl ethyl ketone
PC: Polycarbonate
PP: Polypropylene

EXAMPLE

Experiment 1

Pre-Solution Preparation

Aqueous polyurethane dispersions (PUD-1 to PUD-5) were prepared as listed in Table 1. The compositions, molecular weights, and acid values of PUD-1 to PUD-5 are shown in Table 2. In each case, the utilized diol components were polycarbonate diol (diol 1) and dimethylolpropionic acid (diol 2) synthesized from 1,4-cyclohexanedimethanol and 1,6-hexanediol, respectively. The utilized isocyanate, as indicated in Table 2, was the non-yellowing di-functional isocyanate 4,4'-cyclohexylmethanediisocyanate (H12MDI) and/or isophorone diisocyanate (IPDI). These were reacted to form the urethane prepolymer, the urethane prepolymer was subjected to chain extension using a diamine, and the chain-extended polymer was used as a dispersion in water and N-methylpyrrolidone. Also, di(2-ethylhexyl)fumarate was further blended in PUD-1 and PUD-5 as a plasticizer.

A photostabilizer, UV absorbent and pH adjusting agent, surfactant, and water were jointly added to obtain the same solids content basis fractions in each of the dispersions. Polycarbodiimide as a curing agent was further added (approximately ⅔ equivalent relative to the acid value of the dispersion) to prepare the pre-solutions (presol-1 to presol-5) listed in Table 3. Presol-6 to presol-8 were also prepared by blending of 0, ⅓, or 1 equivalent, respectively, of curing agent in PUD-3.

Production of Film-1 to Film-5, and Film-21 to Film-23 (Surface Layer/Indium Vapor-Deposited Layer/PET)

An approximately 30 nm thick indium layer was vapor deposited (indium vapor-deposited layer) on 0.075 mm thick PET film (T68, manufactured by Toray Industries, Inc.). An aforementioned pre-solution (presol-1 to presol-8) was coated thereon using a bar coater, and the coated film was dried for 20 minutes in a hot blown air-type drying oven at 90° C. and then further dried for 10 minutes in a hot blown air-type oven at 150° C. to obtain film-1 to film-5 and film-21 to film-23 by lamination with the respective polyurethane coating film (surface layer) of approximately 0.03 mm thickness.

Evaluation of Appearance

The respective film-1 to film-5 and film-21 to film-23 was cut to provide a 30 mm×60 mm sample, and while the sample was fixed to a glass plate, the sample was immersed for 240 h in hot water at 40° C., for 120 h in hot water at 60° C., and for 120 h in hot water at 80° C., respectively. The sample was then removed from the hot water, and condition of the sample was observed visually after 24 h. The results are shown in Table 4. The "whitening" of Table 4 was evaluated as follows: "1" when there was no whitening, "2" when while there was whitening, there was a metallic gloss, and "3" when there was marked whitening without metallic gloss. The "other" of the table was evaluated as follows: "1" when there was no occurrence of bubbles, separation, or the like; "2" when there was partial occurrence of bubbles, separation, or the like; and "3" when bubbles or separation occurred over the entire surface.

Production of Film-6 to Film-10 and Film-24 to Film-26 (Surface Layer/Indium Vapor-Deposited Layer/PET)

A bar coater was used to coat a respective pre-solution (presol-1 to presol-8) on a 0.1 mm thick PET film (T60, manufactured by Toray Industries, Inc.). The coated film was dried for 20 minutes in a hot blown air-type drying oven at 90° C. and then further dried for 10 minutes in a hot blown air-type oven at 150° C. to laminate with the respective polyurethane coating film (surface layer) of approximately 0.03 mm thickness (pre-hot water immersion surface layer-attached film).

The obtained pre-hot water immersion surface layer-attached film was cut to obtain a 30 mm ×60 mm sample. The sample was immersed for 240 h in hot water at 40° C., for 120 h in hot water at 60° C., and for 120 h in hot water at 80° C., respectively. The sample was then removed from the hot water (post-hot water immersion surface layer-attached film).

Approximately 30 nm thickness of indium was vapor deposited (indium vapor-deposited layer) on 0.075 mm thickness PET film (T68, manufactured by Toray Industries, Inc.), and then a 0.03 mm thickness smooth colorless transparent acrylic adhesive layer was provided (indium vapor-deposited layer-attached film).

Both films were laminated together so that the polyurethane coating film face of the post-hot water immersion surface layer-attached film contacted the acrylic adhesive layer of the indium vapor-deposited layer-attached film, and the PET film (T60) was peeled off to obtain the post-hot water immersion film-6 to film-10 and film-24 to film 26.

The pre-hot water immersion surface layer-attached film and the indium vapor-deposited layer-attached film were similarly laminated to produce the pre-hot water immersion film-6 to film-10 and film-24 to film-26.

Measurement of Gloss Retention Rate

Gloss of the obtained pre- and post-hot water immersion film-6 to film-10 and film-24 to film-26 was measured using a 20° gloss meter (manufactured by Murakami Color Technical Research, GMX-203). The post-immersion sample was measured after immersion in hot water, removal from the hot water, and waiting for 24 h. The gloss retention rate was taken to be the post-immersion gloss value divided by the pre-immersion gloss value. The results are given in Table 5.

Measurement of Fraction Elongation and Stress at 200 Percent Elongation

The 0.03 mm thick polyurethane coating film (film-3 and film-5) was cut to 10 mm width, and a Tensilon type tensile tester with an attached constant temperature chamber was used at 50 mm length of specimen between grips and 200 mm/minutes speed in a 120° C. environment to measure tensile strength at break, fracture elongation, and stress at 200 percent elongation (tensile strength at 200 percent elongation). Average values were obtained by 3 repeated measurements each, and these results are shown in Table 6.

TABLE 1

| | Polyurethane dispersion | |
|---|---|---|
| No. | Summary | Details |
| PUD-1 | R985 | R985 (manufactured by DSM) (composition of Table 2), including di(2-ethylhexyl)fumarate (DEHF) |
| PUD-2 | UW5101 | Manufactured by Ube Industries, Ltd. (composition of Table 2) |
| PUD-3 | UW5002-1 | Manufactured by Ube Industries, Ltd. (composition of Table 2) |
| PUD-4 | UW5002-2 | 1:1 mixture of PUD-2 and PUD-3 |
| PUD-5 | UW5002-3 | Added di(2-ethylhexyl)fumarate (plasticizer) to PUD-3 |

TABLE 2

| No. | Details | Diol ingredients | | Isocyanate ratio | | Molecular Weight ×10000 | Acid value mg-KOH/g | Plasticizer (DEHF) % |
|---|---|---|---|---|---|---|---|---|
| | | | | H12MDI | IPDI | | | |
| PUD-1 | R985 | Diol 1 | Diol 2 | 5 | 5 | 38.8 | 18.0 | 4 |
| PUD-2 | UW5101 | Diol 1 | Diol 2 | 0 | 10 | 23.5 | 29.3 | 0 |
| PUD-3 | UW5002-1 | Diol 1 | Diol 2 | 10 | 0 | 22.4 | 28.6 | 0 |
| PUD-4 | UW5002-2 | Diol 1 | Diol 2 | 5 | 5 | 22.9 | 29.0 | 0 |
| PUD-5 | UW5002-3 | Diol 1 | Diol 2 | 10 | 0 | 22.4 | 28.6 | 4 |

TABLE 3

| | | presol-1 | presol-2 | presol-3 | presol-4 | presol-5 | presol-6 | presol-7 | presol-8 |
|---|---|---|---|---|---|---|---|---|---|
| PUD-1 | Urethane dispersion | 70 | | | | | | | |
| PUD-2 | ↑ | | 77 | | | | | | |
| PUD-3 | ↑ | | | 77 | | | 77 | 77 | 77 |
| PUD-4 | ↑ | | | | 77 | | | | |
| PUD-5 | ↑ | | | | | 77 | | | |
| Tinuvin292 | Photostabilizer, manufactured by BASF | 0.5 | 0.5 | 0.5 | 0.5 | 0.5 | 0.5 | 0.5 | 0.5 |
| Tinuvin1130 | UV absorbent, manufactured by BASF | 0.9 | 0.9 | 0.9 | 0.9 | 0.9 | 0.9 | 0.9 | 0.9 |
| AMP-95 | pH adjusting agent, manufactured by Dow Chemical | 0.1 | 0.1 | 0.1 | 0.1 | 0.1 | 0.1 | 0.1 | 0.1 |
| GR-7M | Surfactant, manufactured by Dow Chemical | 0.2 | 0.2 | 0.2 | 0.2 | 0.2 | 0.2 | 0.2 | 0.2 |
| DI water | Deionized water | 2 | 2 | 2 | 2 | 2 | 2 | 2 | 2 |
| V-02 | Polycarbodiimide, manufactured by Nisshinbo | 6.5 | 10.5 | 10.5 | 10.5 | 10.5 | 5.25 | 0 | 15.75 |

TABLE 4

| | | Whitening | | | Other | | |
|---|---|---|---|---|---|---|---|
| | | 40° C. × 240 h | 60° C. × 120 h | 80° C. × 120 h | 40° C. × 240 h | 60° C. × 120 h | 80° C. × 120 h |
| Film-1 | Coating of presol-1 | 2 | 3 | 3 | 3 | 3 | 3 |
| Film-2 | Coating of presol-2 | 2 | 3 | 3 | 3 | 3 | 3 |
| Film-3 | Coating of presol-3 | 1 | 2 | 2 | 1 | 1 | 1 |
| Film-4 | Coating of presol-4 | 1 | 2 | 3 | 1 | 2 | 2 |
| Film-5 | Coating of presol-5 | 2 | 2 | 3 | 1 | 1 | 1 |
| Film-21 | Coating of presol-6 | 1 | 2 | 3 | 1 | 1 | 3 |
| Film-22 | Coating of presol-7 | 2 | 3 | 3 | 1 | 1 | 3 |
| Film-23 | Coating of presol-8 | 1 | 2 | 3 | 1 | 1 | 1 |

TABLE 5

| | | 20° gloss retention rate (%) | | | |
|---|---|---|---|---|---|
| | | Not tested | 40 C. × 240 h | 60 C. × 120 h | 80 C. × 120 h |
| Film-6 | Coating of presol-1 | 100 | 88 | 14 | 4 |
| Film-7 | Coating of presol-2 | 100 | 85 | 7 | 5 |
| Film-8 | Coating of presol-3 | 100 | 95 | 69 | 56 |
| Film-9 | Coating of presol-4 | 100 | 93 | 38 | 18 |
| Film-10 | Coating of presol-5 | 100 | 90 | 53 | 24 |
| Film-24 | Coating of presol-6 | 100 | 92 | 44 | 3 |
| Film-25 | Coating of presol-7 | 100 | 85 | 5 | 0 |
| Film-26 | Coating of presol-8 | 100 | 96 | 72 | 60 |

TABLE 6

| | | Fracture elongation (%) | Tensile strength at 200% elongation (N) |
|---|---|---|---|
| Film-3 | UW5002-1 | 255 | 3.0 |
| Film-5 | UW5002-3 | 278 | 2.6 |

Experiment 2

Preparation of Pre-Solution

The polyurethane dispersions (PUD-3, and PUD-6 to PUD-12, 13) listed in Table 7 were prepared. Compositions of PUD-6 to PUD-12 were the same as PUD-3 (see Table 2) except for non-use of plasticizer and changes of the molecular weights and acid values (see Table 7).

In the same manner as for the aforementioned presol-3 of Table 3, to each dispersion were added a photostabilizer, UV absorbent, pH adjusting agent, surfactant, water and polycarbodiimide curing agent to prepare the pre-solution (presol).

Production of Film-8 and Film-11 to Film-17, 30 (Surface Layer/PET)

A bar coater was used to coat a respective pre-solution obtained in the aforementioned manner on 0.1 mm thick PET film (T60, manufactured by Toray Industries, Inc.), and the coated film was dried for 20 minutes in a hot blown air-type drying oven at 90° C. and then further dried for 10 minutes in a hot blown air-type oven at 150° C. to produce film-8 and film-11 to film-17 and film-30 by lamination with the respective polyurethane coating film (surface layer) of approximately 0.03 mm thickness. Molecular weight, acid value, and the calculated value of the formula (1) below for the polyurethane coating film of each film are shown in Table 10.

$$[(300{,}000-\text{molecular weight})/50{,}000]^2 + (\text{acid value}-25)^2 \qquad \text{Formula (1)}$$

The obtained film was cut to obtain a 30 mm×60 mm sample. The sample was immersed for 24 h in hot water at 40° C., for 240 h in hot water at 40° C., and for 120 h in hot water at 80° C., respectively. The sample was then removed from the hot water (post-hot water immersion surface layer-attached film-8 and film-11 to film-17), and film-30.

Approximately 30 nm of indium was vapor deposited (indium vapor-deposited layer) on 0.075 mm thickness PET film (T68, manufactured by Toray Industries, Inc.), and then a 0.03 mm thickness smooth colorless transparent acrylic adhesive layer was provided (indium vapor-deposited layer-attached film).

Both films were laminated together so that the polyurethane coating film face of the post-hot water immersion surface layer-attached film contacted the acrylic adhesive layer of the indium vapor-deposited layer-attached film, and the PET film (T60) was peeled off from the surface layer-attached film (post-hot water immersion laminate film-8 and film-11 to film-17 and film-30).

The pre-hot water immersion surface layer-attached films and the indium vapor-deposited layer-attached films were similarly laminated to produce samples (pre-hot water immersion laminate film-8 and film-11 to film-17).

Check of Visual Appearance and Measurement of Gloss Retention Rate

Results were obtained by the same evaluation methods as those of Experiment 1, and the results are shown in Table 9. In Table 9, the expression "non-tested" indicates that a pre-hot water immersion sample was used. Test conditions of the water resistance testing (water resistance-1 to water resistance-3) are shown in Table 8.

TABLE 7

| No. | Details | Molecular Weight × 10000 | Acid value mg-KOH/g |
|---|---|---|---|
| PUD-3 | UW5002-1 | 22.4 | 28.6 |
| PUD-6 | UW5002-4 | 18.5 | 25.8 |
| PUD-7 | UW5002-5 | 22.2 | 27.0 |
| PUD-8 | UW5002-6 | 12.9 | 27.1 |
| PUD-9 | UW5002-7 | 10.8 | 27.3 |
| PUD-10 | UW5002-8 | 9.7 | 27.2 |
| PUD-11 | UW5002-9 | 9.8 | 28.8 |
| PUD-12 | UW5002-10 | 8.5 | 28.8 |
| PUD-13 | UW5002-11 | 41.5 | 26.7 |

TABLE 8

| | Test conditions | Goal |
|---|---|---|
| Water resistance-1 | Water immersion for 24 h at 40° C. | Reference conditions to check the correlation between water resistance and the value of the formula |
| Water resistance-2 | Water immersion for 240 h at 40° C. | Most standard test conditions for an automotive exterior film, basic film design standard |
| Water resistance-3 | Water immersion for 120 h at 80° C. | Highest temperature test conditions for an automotive exterior film, design standard for a more robust film |

TABLE 9

| | | Presence or absence of visible whitening | | | | 20° Gloss retention rate (%) | | | |
|---|---|---|---|---|---|---|---|---|---|
| | | Not tested | Water resistance-1 | Water resistance-2 | Water resistance-3 | Not tested | Water resistance-1 | Water resistance-2 | Water resistance-3 |
| Film-8 | Coating film of PUD-3 derived presol | Absent | Absent | Absent | Present | 100 | 101 | 95 | 56 |
| Film-11 | Coating film of PUD-6 derived presol | Absent | Absent | Absent | Absent | 100 | 100 | 100 | 97 |
| Film-12 | Coating film of PUD-7 derived presol | Absent | Absent | Absent | Absent | 100 | 101 | 100 | 96 |
| Film-13 | Coating film of PUD-8 derived presol | Absent | Absent | Absent | Present | 100 | 99 | 93 | 66 |
| Film-14 | Coating film of PUD-9 derived presol | Absent | Absent | Present | Present | 100 | 97 | 82 | 53 |
| Film-15 | Coating film of PUD-10 derived presol | Absent | Absent | Present | Present | 100 | 93 | 83 | 50 |

TABLE 9-continued

| | | Presence or absence of visible whitening | | | | 20° Gloss retention rate (%) | | | |
|---|---|---|---|---|---|---|---|---|---|
| | | Not tested | Water resistance-1 | Water resistance-2 | Water resistance-3 | Not tested | Water resistance-1 | Water resistance-2 | Water resistance-3 |
| Film-16 | Coating film of PUD-11 derived presol | Absent | Present | Present | Present | 100 | 90 | 83 | 45 |
| Film-17 | Coating film of PUD-12 derived presol | Absent | Present | Present | Present | 100 | 73 | 69 | 34 |
| Film-30 | Coating film of PUD-13 derived presol | Absent | Absent | Absent | Absent | 100 | 100 | 100 | 99 |

TABLE 10

| | Molecular Weight × 10000 | Acid value mg-KOH/g | Calculated value (Formula 1) |
|---|---|---|---|
| Film-8 | 22.4 | 28.6 | 15.3 |
| Film-11 | 18.5 | 25.8 | 5.9 |
| Film-12 | 22.2 | 27.0 | 6.4 |
| Film-13 | 12.9 | 27.1 | 16.1 |
| Film-14 | 10.8 | 27.3 | 20.0 |
| Film-15 | 9.7 | 27.2 | 21.3 |
| Film-16 | 9.8 | 28.8 | 30.5 |
| Film-17 | 8.5 | 28.8 | 32.9 |
| Film-30 | 41.5 | 26.7 | 8.2 |

Experiment 3

Production of Film-27 and Film-28

A black-colored polyurethane bonding layer solution (see Table 11 for the composition) was coated using a bar coater on the corona-treated face side of a 0.1 mm thick corona-treated polyolefin film (RXC-3, manufactured by Mitsui Chemicals Tohcello Inc.). The coated film was placed for 3 minutes in a blown hot air-type oven at 80° C. to produce an approximately 0.03 mm thickness coating film. The polyurethane coating film face of the film-13 or film-17 produced during Experiment 2 was corona treated, and the aforementioned black-colored polyurethane coating film was roll laminated thereon to produce a 4 layer film (film-27 or film-28: polyolefin/black-colored polyurethane coating film/polyurethane coating film/PET film).

Evaluation of Moldability

The PET film was peeled from the film-27 or film-28, and the sample was set on the opening of a vacuum-pressure forming machine. A box-shaped cavity of 26 cm×26 cm inner diameter and 8 cm depth was formed below the aperture. A 3 mm thick polypropylene plate (test panel extrusion molded using NOVATEC MH4, manufactured by Japan Polypropylene Corp.) was placed at the bottom as the adherend. Under conditions reaching down to a vacuum of 0.05 atm or less (where absolute vacuum is 0.00 atm, and atmospheric pressure is taken to be 1.00 atm), each film was molded to the polypropylene plate under three sets of conditions at a film heating temperature of 150° C. In each case, the film conformed to and was attached to the entire surface of the polypropylene plate while stretching approximately 2.5-fold (surface area ratio).

Evaluation of Appearance

After the water resistance test (240 h of immersion in water at 40° C.) of film-27 or film-28, the presence or absence of whitening was checked. The results are shown in Table 12.

Moreover, the PET film of film-27 or film-28 was peeled off, and an experiment was performed using an xenon arc lamp type accelerated weather resistance tester (manufactured by Suga Shikenki Co., Ltd., high energy xenon weather meter SC750-WAP) under 63° C. black panel temperature, humid, rainfall conditions up to an integrated energy of 750 MJ with the adhesive attached to aluminum plate. Thereafter, the color difference relative to the untested article was measured using a Datacolor 600, manufactured by Suncolor Co. Ltd. Gloss (A) of the untested article and gloss (B) of the tested article were measured using a 60° gloss meter (manufactured by Murakami Color Technical Research, GMX-203), and the gloss retention rate (B/A (%)) was calculated. The results are shown in Table 12.

TABLE 11

| Raw material (manufacturer) | Composition | Blend ratio |
|---|---|---|
| Nipporan 3124 (Nippon Polyurethane Industry Co., Ltd.) | 2-liquid curing type polyurethane adhesive | 80 |
| TT501 (black pigment, manufactured by BASF) | Black coating material manufactured by dispersion of carbon black in resin | 20 |
| HL curing agent (Nippon Polyurethane Industry Co., Ltd.) | HDI type polyisocyanate curing agent | 4 |
| Ethyl acetate | Solids basis percent content, viscosity adjustment dilution solvent | 40 |
| Tin catalyst | Catalyst for promotion of the isocyanate reaction | 0.01 |

TABLE 12

| | | | Weather resistance | |
|---|---|---|---|---|
| | Moldability | Water resistance | Color difference (ΔE*) | Gloss retention (%) |
| Film-27 | Both forming follow-up and adhesion were good | No whitening | 0.2 | 95.9 |
| Film-28 | Both forming follow-up and adhesion were good | Whitening | 0.3 | 95.5 |

Experiment 4

Production of Film-18 and Film-19

Except for change of thickness to 0.05 mm from the thickness of the PET film produced in Experiment 2 for film-13 and film-17, samples produced in the same manner as those of film-13 and film-17 were subjected to vacuum deposition on the polyurethane coating film surface to apply an indium vapor-deposited layer of approximately 30 nm thickness (PET/surface layer/indium vapor-deposited layer).

A polyurethane bonding layer solution (NIPPORAN 3124 (manufactured by Nippon Polyurethane Industry Co., Ltd.)/ CORONATE L-45 (manufactured by Soken Chemical Engineering Co., Ltd.)/ethyl acetate/tin catalyst=100/10/50/0.01 (weight ratios)) was coated on the corona-treated surface side of 0.1 mm thick corona-treated polyolefin film (RXC-3, manufactured by Mitsui Chemicals Tohcello Inc.). The coated film was placed for 3 minutes in a blown air type drying oven at 80° C. to form a coating film of approximately 0.015 mm to approximately 0.02 mm thickness. Thereafter, the indium vapor-deposited face of the sample obtained in the aforementioned manner was roll laminated on the polyurethane bonding layer to produce a 5 layered film (film-18 and film-19).

Production of Film-20

An approximately 0.05 mm thick polyurethane coating film was prepared using caprolactone diol oil and isophorone diisocyanate trimer as described in Experiment 2 of Japanese Unexamined Patent Application Publication No. H05-155976, and a 5-layer film was produced with the same configuration (film-20).

Production of PP Structure 1 to 3, and Evaluation of Moldability and Adhesiveness The PET film was peeled from the obtained film-18, film-19, and film-20, and the respective film sample was set on the aperture of the vacuum-pressure forming machine. A box-shaped cavity of 26 cm×26 cm inner diameter and 8 cm depth was formed below the aperture. A 3 mm thick polypropylene plate (test panel extrusion molded using NOVATEC MH4, manufactured by Japan Polypropylene Corp.) was placed at the bottom as the adherend. Under conditions reaching down to a vacuum of 0.05 atm or less (where absolute vacuum is 0.00 atm, and atmospheric pressure is taken to be 1.00 atm), each film was molded under three sets of conditions, i.e. at film heating temperatures of 130° C., 150° C., and 170° C. Moldability was evaluated as follows: "1" the sample adhered to the entire substrate surface, "2" the sample adhered partially to the substrate surface, and "3" the sample was torn and did not adhere. For samples that were able to adhere to the substrate surface, two cuts were made in the film surface to form a 10 mm wide strip, and adhesion force was measured by debonding testing of a 10 mm wide×100 mm long test strip in the 180° direction at a speed of 200 mm/minute. An adhesion force greater than or equal to 6.4 N is the standard value to be passed for adhesion force of an exterior film. The results are shown in Table 13.

Evaluation of Appearance

The respective PET film was peeled from the film-18, film-19, and film-20 sample, and the film sample was immersed in hot water at 40° C. The sample was observed after 24 h of immersion and after 240 h of immersion. The results are shown in Table 14. Within Table 14, "not tested" indicates the use of a sample that had not been immersed in hot water.

Evaluation of Weather Resistance

Moreover, the respective PET film was peeled from film-18, film-19, or film-20, and an experiment was performed using an xenon arc lamp type accelerated weather resistance tester (manufactured by Suga Shikenki Co., Ltd., high energy xenon weather meter SC750-WAP) under 63° C. black panel temperature, humid, rainfall conditions up to an integrated energy of 750 MJ with the adhesive attached to aluminum plate. Thereafter, the color difference relative to the untested article and gloss retention rate were measured. The standard values for passing weather resistance as an exterior film are a color difference ($\Delta E^*$) of less than or equal to 3 and a gloss retention rate of greater than or equal to 75 percent. The results are shown in Table 15.

TABLE 13

|  | Moldability | | | Adhesion force (N/10 mm) | | |
| --- | --- | --- | --- | --- | --- | --- |
|  | 130° C. | 150° C. | 170° C. | 130° C. | 150° C. | 170° C. |
| PP structure -1 (derived from film-18) | 1 | 1 | 1 | 8.0 | 9.9 | 17.3 |
| PP structure -2 (derived from film-19) | 1 | 1 | 1 | 8.3 | 11.1 | 14.3 |
| PP structure -3 (derived from film-20) | 3 | 3 | 3 | — | — | — |

TABLE 14

| | Whitening due to 40° C. water immersion test | | |
| --- | --- | --- | --- |
| | Not tested | 24 hours | 240 hours |
| Film-18 | No whitening | No whitening | No whitening |
| Film-19 | No whitening | Whitening | Whitening |
| Film-20 | No whitening | No whitening | No whitening |

TABLE 15

| | Weather resistance | |
| --- | --- | --- |
| | Color difference ($\Delta E^*$) | Gloss retention rate (%) |
| Film-18 | 1.1 | 92.7 |
| Film-19 | 1.3 | 90.1 |
| Film-20 | 1.5 | 92.3 |

Experiment 5

Production of 3-Layer Film-1 and 3-Layer Film-2 (PET/Surface Layer/Indium Vapor-Deposited Layer)

Vacuum deposition equipment was used to laminate an approximately 30 nm thick indium vapor-deposited layer on the polyurethane coating film surface of a surface layer-attached film (PET/surface layer) film-13 or film-17 produced in Experiment 2, thereby producing two types of S-layer film. The film-13-derived 3-layer film was designated as 3-layer film-1, and the film-17-derived 3-layer film was designated as 3-layer film-2.

Production of 5-Layer Films 1-1 and 1-2 (PET/Surface Layer/Indium Vapor-Deposited Layer/Acrylic Type Adhesion Layer/Release Paper)

A solution obtained by mixing and stirring 1502 FS (acrylic pressure sensitive adhesive, manufactured by Soken Chemical Engineering Co., Ltd.) and CORONATE L-45 (isocyanate curing agent, manufactured by Soken Chemical Engineering Co., Ltd.) at a ratio of 100/5 (weight ratio) was coated using a bar coater on release paper that had undergone release treatment. The film was then placed in a hot blown air type oven at 80° C. for 5 minutes to produce an approximately 0.03 mm thick coating film. Thereafter, the respective indium vapor-deposited faces of the 3-layer film-1 and film-2 were roll laminated to produce two types of 5-layer films (i.e. 5-layer film 1-1 and film 1-2, respectively).

Production of ABS Structures 1 and 2

The respective PET film and the release paper were peeled from the 5-layer film 1-1 or 1-2, and by vacuum-pressure forming in the same manner as in Experiment 4, an attached substrate was produced using 2 mm thick ABS plate. Attachment was performed while stretching approximately 2.5-fold (surface area ratio) at a film heating temperature of 150° C. ABS plates (ABS structures 1 and 2) were obtained that had a uniform metallic appearance.

Production of 6-Layer Films 1-1 and 1-2 (PET/Surface Layer/Indium Vapor-Deposited Layer/Urethane Type Bonding Layer/Urethane Adhesion Layer/Release Paper)

DESMOCOLL 530 (polyurethane heat-sensitive adhesive, manufactured by Bayer) in MEK solution (20 percent solids content) was coated using a bar coater on release paper, and the coated release paper was placed in a hot blown air type oven at 80° C. for 5 minutes to produce a coating film of approximately 0.015 mm thickness.

Thereafter, the same polyurethane bonding layer solution as that used in Experiment 4 was applied, and the resultant film was placed in a hot blown air type oven at 80° C. for 3 minutes to produce a coating film of approximately 0.015 to 0.02 mm thickness. Thereafter, the indium vapor-deposited face of the 3-layer film 1 or 2 was roll laminated to produce the 6-layer film 1-1 or 1-2, respectively.

Production of Polycarbonate Structures 1 and 2

The respective PET film and the release paper were peeled from the 6-layer film 1-1 or 1-2, and by vacuum-pressure forming in the same manner as in Experiment 4, an attached substrate was produced using 2 mm thick polycarbonate plate. Attachment was performed while stretching approximately 2.5-fold (surface area ratio) at a film heating temperature of 150° C. Polycarbonate plates (polycarbonate structures 1 and 2) were obtained that had a uniform metallic appearance.

Production of 6-Layer Films 2-1 and 2-2 (PET/Surface Layer/Indium Vapor-Deposited Layer/Urethane Type Bonding Layer/Polyester Adhesion Layer/Release Paper)

A stirred mixed solution of ELITEL 530 (polyester type heat-sensitive adhesive, manufactured by Unitika Ltd.) in MEK solution (35 percent solids content) and HL curing agent (HDI polyisocynate, manufactured by Nippon Polyurethane Industry Co., Ltd.) (weight ratio=100/3) was coated using a bar coater on release paper, and the coated release paper was placed in a hot blown air type oven at 80° C. for 3 minutes to produce a coating film of approximately 0.015 mm thickness.

Thereafter, the same polyurethane bonding layer solution as that used in Experiment 4 was applied, and the resultant film was placed in a hot blown air type oven at 80° C. for 3 minutes to produce a coating film of approximately 0.015 to 0.02 mm thickness. Thereafter, the indium vapor-deposited face of the 3-layer film 1 or 2 was roll laminated at 60° C. to produce the 6-layer film 2-1 or 2-2, respectively.

Production of Stainless Steel Structures 1 and 2

An approximately 0.4 mm thick stainless steel plate (SUS 430, BA surface finished) was wiped using a cleaning cloth containing KBS17A/B (acrylic primer, manufactured by Konishi Co., Ltd.) to coat the stainless steel plate. The stainless steel plate was then heated at 220° C. to form a primer coating film of approximately 0.002 mm thickness. Thereafter, the release paper was peeled off by residual heating at approximately 200° C. Then, the 6-layer film 2-1 or 2-2 was roll laminated and attached. Thereafter, the PET film was peeled off, and press molding was performed in the same manner using a press die and punching die to form the stainless frame of an automobile quarter glass part. Stainless steel frame parts (stainless steel structures 1 and 2) were obtained that had a uniform decorative metallic appearance.

Production of 5-Layer Films 2-1 and 2-2 (PET/Surface Layer/Indium Vapor-Deposited Layer/Polyamide Type Adhesion Layer/Release Paper)

A toluene/isopropyl alcohol solution of MACROMELT 6240 (polyamide heat-sensitive adhesive, manufactured by Henkel AG & Co.) (25 percent solids content) was coated using a bar coater on release paper, and the coated release paper was placed in a hot blown air type oven at 80° C. for 5 minutes to produce a coating film of approximately 0.02 mm thickness. Thereafter, the indium vapor-deposited face of the 3-layer film 1 or 2 was roll laminated at 50° C. to produce the 5-layer film 2-1 or 2-2, respectively.

Production of Polyurethane Structures 1 and 2

The PET film and release paper were peeled from the obtained film, and then the urethane surface side of the film was set in contact with a porous metal die provided with a cavity in the shape of an automotive exterior decorative emblem. While the surface was heated by a panel heater, the film was made to conform to the shape of the cavity by reduction of pressure of the porous metal die. A solvent-free 2-liquid type curing type polyurethane pre-solution mixed with a solvent-free liquid type polyester polyol/hydrogenated MDI/metal catalyst was fed into the die and was allowed to cure for approximately 3 minutes. Then, the molded article was removed from the die, and the peripheral excess part of the film was trimmed off. Polyurethane emblems (polyurethane structures 1 and 2) were obtained that had a uniform decorative metallic appearance.

Production of 5-Layer Films 3-1 and 3-2 (PET/Surface Layer/Indium Vapor-Deposited Layer/Polyurethane Type Bonding Layer/ABS Film Adhesion Layer)

The same polyurethane bonding layer solution as that used in Experiment 4 was applied to approximately 0.4 mm thick 975BK1 (ABS film, manufactured by Shin-Etsu Polymer Co., Ltd.), and the resultant film was placed in a hot blown air type oven at 80° C. for 3 minutes to produce a coating film of approximately 0.015 to 0.02 mm thickness. Thereafter, the indium vapor-deposited face of the 3-layer film 1 or 2 was roll laminated at 60° C. to produce a 5-layer film (5-layer film 3-1 or 3-2, respectively).

Production of ABS Adhesion ABS Structures 1 and 2

Using an automotive quarter glass part frame-shaped CHEMIWOOD material vacuum forming mold, the PET film was peeled from the obtained 5-layer film 3, resultant film was set against the mold so that the ABS surface contacted the mold, and the film was vacuum formed. The peripheral part was trimmed off, and the molded article was set in an injection mold that had a cavity of the same shape. Molten ABS was injection molded to obtain quarter glass part frame ABS part that had a uniform metallic appearance (ABS adhesion ABS structures 1 and 2).

Production of 5-Layer Films 4-1 and 4-2 (PET/Surface Layer/Indium Vapor-Deposited Layer/Polyurethane Type Bonding Layer/PVC Film Adhesion Layer)

The same polyurethane bonding layer solution as that used in Experiment 4 was applied to approximately 0.015 mm thick SR-P40 (PVC film, manufactured by Tatsuta Chemical Co., Ltd.), and the resultant film was placed in a hot blown air type oven at 80° C. for 3 minutes to produce a coating film of approximately 0.015 to 0.02 mm thickness.

Thereafter, the indium vapor-deposited face of the 3-layer film 1 or 2 was roll laminated on the coating film to produce a 5-layer film (5-layer film 4-1 or 4-2, respectively).

Production of PVC Adhesion PVC Structures 1 and 2

The 5-layer film 4-1 or 4-2 was set so that the PVC film side contacted the molding resin in an injection mold that had a cavity having 40 mm radius, 20 mm height, and 3 mm gap, and molten PVC resin was injection molded. When the molded article had cooled to room temperature, the molded article was removed, the PET film was peeled off, and the excess peripheral film part was trimmed off. A disk shaped part (PVC adhesion PVC structure 1 or 2, respectively) was obtained that had a uniform metallic appearance.

Evaluation of Appearance

For all structure samples, the sample was checked for the presence or absence of whitening after immersion in hot water (i.e. 240 h of immersion in water at 40° C.). Configurations of the structure samples are shown in Table 16, and results are shown in Table 17.

TABLE 16

| Bonding layer | Adhesion layer | Forming method | Substrate |
|---|---|---|---|
| Absent | Acrylic pressure sensitive adhesive | Vacuum-pressure forming | ABS |
| Present | Polyurethane heat sensitive adhesive | Vacuum-pressure forming | Polycarbonate |
| Present | Polyester heat sensitive adhesive | Press forming | Primer-coated stainless steel |
| Absent | Polyamide heat sensitive adhesive | Vacuum-pressure forming | Polyurethane |
| Present | ABS film | Vacuum forming/injection molding | ABS |
| Present | PVC film | Injection molding | PVC |

TABLE 17

| Structure | Moldability | Water resistance |
|---|---|---|
| ABS structure 1 | Both forming follow-up and adhesion were good | No whitening |
| PC structure 1 | Both forming follow-up and adhesion were good | No whitening |
| Stainless steel structure 1 | Both forming follow-up and adhesion were good | No whitening |
| Polyurethane structure 1 | Both forming follow-up and adhesion were good | No whitening |
| ABS adhesion ABS structure 1 | Both forming follow-up and adhesion were good | No whitening |
| PVC adhesion PVC structure 1 | Both forming follow-up and adhesion were good | No whitening |
| ABS structure 2 | Both forming follow-up and adhesion were good | Whitening |
| PC structure 2 | Both forming follow-up and adhesion were good | Whitening |
| Stainless steel structure 2 | Both forming follow-up and adhesion were good | Whitening |
| Polyurethane structure 2 | Both forming follow-up and adhesion were good | Whitening |
| ABS adhesion ABS structure 2 | Both forming follow-up and adhesion were good | Whitening |
| PVC adhesion PVC structure 2 | Both forming follow-up and adhesion were good | Whitening |

Experiment 6

Production of 5-Layer Films 5-1 to 5-15

Vacuum deposition was used to laminate an indium vapor-deposited layer of approximately 30 nm thickness on the polyurethane coating film surface of the film-12, film-13, or film-17 produced in Experiment 2 (PET/surface layer/indium vapor-deposited layer).

A polyurethane bonding layer solution (for the compositions, see blend-1 to blend-5 in Table 18) was coated on the corona-treated surface side of a 0.1 mm thick corona-treated polyolefin film (RXC-3, manufactured by Mitsui Chemicals Tohcello Inc.), and the resultant film was placed in a hot blown air type oven at 80° C. for 3 minutes to form an approximately 0.015 mm to approximately 0.02 mm thick coating film. Thereafter, the indium vapor-deposited face of the obtained aforementioned film sample (PET/surface layer/indium vapor-deposited layer) was roll laminated with the polyurethane bonding layer to produce 15 types of 5-layer films (5-layer films 5-1 to 5-15). The compositions are shown in Table 20.

Production of 5-layer Films 6-1 to 6-17

An approximately 30 nm thick indium vapor-deposited layer was laminated by vacuum deposition on the polyurethane coating film surface of the film-12, film-13, or film-17 produced in Experiment 2 (PET/surface layer/indium vapor-deposited layer).

A polyurethane bonding layer solution (for the compositions, see blend-1 and blend-6 in Table 19) was coated on the corona-treated surface side of 0.1 mm thick corona-treated polyolefin film (RXC-3, manufactured by Mitsui Chemicals Tohcello Inc.), and the resultant film was placed in a hot blown air type oven at 80° C. for 3 minutes to form an approximately 0.015 mm to approximately 0.02 mm thick coating film. Thereafter, the indium vapor-deposited face of the obtained aforementioned film sample was roll laminated with the polyurethane bonding layer to produce 17 types of 5-layer films (5-layer films 6-1 to 6-17). The compositions are shown in Table 21.

Alcohol (Methanol) Resistance Test

The PET film was peeled from each of the 5-layer films, and the respective film sample was fixed to an aluminum plate. The assembly was immersed in methanol for 0.5 h, was removed, and was immediately visually evaluated. The results are shown in Tables 20 and 21.

TABLE 18

| Raw material | Blend ratio | | | | |
|---|---|---|---|---|---|
| (manufacturer) | Blend-1 | Blend-2 | Blend-3 | Blend-4 | Blend-5 |
| NIPPORAN 3124 (Nippon Polyurethane Industry Co., Ltd.) | 100 | 100 | 100 | 100 | 100 |
| CORONATE L-45 (Soken Chemical Engineering Co., Ltd.) | 10 | 10 | 10 | 10 | 10 |
| Ethyl acetate | 50 | 50 | 50 | 50 | 50 |
| Tin catalyst | 0.01 | 0.01 | 0.01 | 0.01 | 0.01 |
| BYK 315 (BYK-Chemie)* | 0 | 0.3 | 0.7 | 1 | 2 |

*Polysiloxane type silicone additive

TABLE 19

| Raw material (manufacturer) | Blend-1 | Blend-6 | Blend-7 | Blend-8 | Blend-9 | Blend-10 | Blend-11 |
|---|---|---|---|---|---|---|---|
| Nipporan 3124 (Nippon Polyurethane Industry Co., Ltd.) | 100 | 100 | 100 | 100 | 100 | 100 | 100 |
| CORONATE L-45 (Soken Chemical Engineering Co., Ltd.) | 10 | 10 | 10 | 10 | 10 | 10 | 10 |
| Ethyl acetate | 50 | 50 | 50 | 50 | 50 | 50 | 50 |
| Tin catalyst | 0.01 | 0.01 | 0.01 | 0.01 | 0.01 | 0.01 | 0.01 |
| KBM-903 (Shin-Etsu Silicone) | 0 | 0.2 | 0.5 | 1.0 | 2.5 | 0 | 0 |
| KBE-9103 (Shin-Etsu Silicone) | 0 | 0 | 0 | 0 | 0 | 1.0 | 0 |
| KBE-9007 (Shin-Etsu Silicone) | 0 | 0 | 0 | 0 | 0 | 0 | 1.0 |

TABLE 20

| 5 Layer film | Polyurethane coating film | Bonding layer | Presence or absence of abnormal appearance | |
|---|---|---|---|---|
| | | | Whitening | Other |
| 5-1 | Film-12 | Blend-1 | Marked whitening | Absent |
| 5-2 | Film-12 | Blend-2 | Somewhat whitened | Absent |
| 5-3 | Film-12 | Blend-3 | No whitening | Absent |
| 5-4 | Film-12 | Blend-4 | No whitening | Absent |
| 5-5 | Film-12 | Blend-5 | No whitening | Generated wrinkles |
| 5-6 | Film-13 | Blend-1 | Marked whitening | Absent |
| 5-7 | Film-13 | Blend-2 | Marked whitening | Absent |
| 5-8 | Film-13 | Blend-3 | Somewhat whitened | Absent |
| 5-9 | Film-13 | Blend-4 | No whitening | Absent |
| 5-10 | Film-13 | Blend-5 | No whitening | Generated wrinkles |
| 5-11 | Film-17 | Blend-1 | Marked whitening | Absent |
| 5-12 | Film-17 | Blend-2 | Marked whitening | Absent |
| 5-13 | Film-17 | Blend-3 | Marked whitening | Absent |
| 5-14 | Film-17 | Blend-4 | Marked whitening | Absent |
| 5-15 | Film-17 | Blend-5 | Marked whitening | Generated wrinkles |

TABLE 21

| 5 Layer film | Polyurethane coating film | Bonding layer | Presence or absence of abnormal appearance | |
|---|---|---|---|---|
| | | | Whitening | Other |
| 6-1 | Film-12 | Blend-1 | Marked whitening | Absent |
| 6-2 | Film-12 | Blend-6 | No whitening | Absent |
| 6-3 | Film-12 | Blend-7 | No whitening | Absent |
| 6-4 | Film-12 | Blend-8 | No whitening | Absent |
| 6-5 | Film-12 | Blend-9 | No whitening | Generated wrinkles |
| 6-6 | Film-13 | Blend-1 | Marked whitening | Absent |
| 6-7 | Film-13 | Blend-6 | Marked whitening | Absent |
| 6-8 | Film-13 | Blend-7 | No whitening | Absent |
| 6-9 | Film-13 | Blend-8 | No whitening | Absent |
| 6-10 | Film-13 | Blend-9 | No whitening | Generated wrinkles |
| 6-11 | Film-13 | Blend-10 | No whitening | Absent |
| 6-12 | Film-13 | Blend-11 | No whitening | Absent |
| 6-13 | Film-17 | Blend-1 | Marked whitening | Absent |
| 6-14 | Film-17 | Blend-6 | Marked whitening | Absent |
| 6-15 | Film-17 | Blend-7 | Marked whitening | Absent |
| 6-16 | Film-17 | Blend-8 | Marked whitening | Absent |
| 6-17 | Film-17 | Blend-9 | Marked whitening | Generated wrinkles |

Experiment 7

Production of 5-layer Films 7-1 to 7-5

Vacuum deposition was used to laminate an approximately 30 nm thick indium vapor-deposited layer on the polyurethane coating film surface of film-12 produced in Experiment 2 (PET/surface layer/indium vapor-deposited layer).

A roll laminator was used to temporarily pressure bond the indium vapor-deposited surface to the material listed in Table 22 at a pressure of approximately 3 kgf/cm$^2$ at 50° C. Then, after the material was peeled away, the amount of silica (elemental silicon) of the indium surface was measured using ESCA (Electron Spectroscopy for Chemical Analysis, X-ray photoelectron analyzer manufactured by Shimadzu Corp.). The amount of silica of the surface is shown in Table 22.

A polyurethane bonding layer solution (for the compositions, see blend-1 to blend-5 in Table 18) was coated on the corona-treated surface side of a 0.1 mm thick corona-treated polyolefin film (RXC-3, manufactured by Mitsui Chemicals Tohcello Inc.), and the resultant film was placed in a hot blown air type oven at 80° C. for 3 minutes to form an approximately 0.015 mm to approximately 0.02 mm thick coating film. Thereafter, the indium vapor-deposited face of the obtained aforementioned film sample was roll laminated with the polyurethane bonding layer to produce 5 types of 5-layer films (5-layer films 7-1 to 7-5). Alcohol (methanol) Resistance Test The PET film was peeled from each of the 5-layer films, and the respective film sample was fixed to an aluminum plate. The assembly was immersed in methanol for 0.5 h, was removed, and was immediately visually evaluated. The results are shown in Table 22.

TABLE 22

| 5 Layer film | Material | Amount of surface silica (%) | Presence or absence of abnormal appearance | |
|---|---|---|---|---|
| | | | Whitening | Other |
| 7-1 | (None) | 0 | Marked whitening | Absent |
| 7-2 | Silicone rubber | 7.3 | No whitening | Absent |
| 7-3 | PET film | 0 | Marked whitening | Absent |
| 7-4 | Stainless steel | 0 | Marked whitening | Absent |
| 7-5 | Glass | 0 | Marked whitening | Absent |

Experiment 8

Production of 5-Layer Films 8-1 to 8-4 and Propylene (PP) Structures 1 to 4

Approximately 30 nm of indium vapor-deposited layer was laminated by vacuum deposition on the polyurethane coating film surface of the film-13 produced in Experiment 2 (PET/surface layer/indium vapor-deposited layer).

The corona-treated surface side of 0.1 mm thick corona-treated polyolefin film (RXC-3, manufactured by Mitsui Chemicals Tohcello Inc.) was wiped using a cleaning cloth including the three types of primers listed below (A, B, and C) to form a primer coating film of approximately 0.001 mm thickness.

Primer A:

K500 (manufactured by Sumitomo 3M Ltd.) chlorinated polyolefin, isocyanate

Primer B:

K540NT (manufactured by Sumitomo 3M Ltd.) chlorinated polyolefin

Primer C:

UNISTOLE P801 (non-halogen-modified polyolefin, manufactured by Mitsui Chemicals, Inc.)/CORONATE HL (HDI polyisocyanate, manufactured by Nippon Polyurethane Industry Co., Ltd.)=100/6

Furthermore, a polyurethane bonding layer solution (blend-1 of Table 18) was further coated, and the resultant film was placed in a hot blown air type oven at 80° C. for 3 minutes to form an approximately 0.015 mm to approximately 0.02 mm thick coating film. Thereafter, the indium vapor-deposited face of the obtained aforementioned film sample was roll laminated with the polyurethane bonding layer to produce 5-layer films (5-layer films 8-1 to 8-8).

The PET film was peeled from each film sample, and vacuum-pressure forming in the same manner as in Experiment 4 was used to attach the film sample to a polypropylene plate while stretching the film sample approximately 2.5-fold (surface area ratio) at a film heating temperature of 150° C. to obtain the propylene (PP) structures 1 to 4. The structure that had the primer A coating film was designated structure 2. The structure that had the primer B coating film was designated structure 3. The structure that had the primer coating film was designated structure 4. The structure that had no primer coating film was designated structure 1.

Various Types of Testing

Each structure was subjected to heat resistance testing (80° C. for 240 h). Each sample was tested for water resistance (immersion at 40° C. for 240 h), and then one hour later, was tested for adhesion force by debonding testing (peeling of a 10 mm wide sample in the 180° direction at 200 mm/minute), and was checked for adhesion by tape snap testing (using a razor to cut the film surface into a total of 100 (=10×10) 2 mm×2 mm parts, then affixing cellophane tape manufactured by Nichiban Co. Ltd., and peeling off the cellophane tape suddenly). Each measurement was repeated 3 times, and the average value was used as the measurement result. The results are shown in Table 23.

Due to setting of depth of the cavity for vacuum forming to 4 cm, samples were produced that had a film elongation of approximately 1.5 fold. Adhesion force and adhesion were similarly measured. Each measurement was repeated 3 times, and the average values were used as the measurement results. The results are shown in Table 24.

TABLE 23

| | 2.5-fold elongation (surface area ratio) | | | |
|---|---|---|---|---|
| | After heat resistance testing | | After water resistance testing | |
| Structure | Adhesion force | Adhesion | Adhesion force | Adhesion |
| PP structure 1 (film 8-1/no primer) | 16.2 | 60 | 14.5 | 92 |
| PP structure 2 (film 8-2/primer A) | 15.2 | 100 | 13.8 | 100 |
| PP structure 3 (film 8-3/primer B) | 17.6 | 100 | 14.8 | 100 |
| PP structure 4 (film 8-4/primer C) | 16.0 | 100 | 12.6 | 100 |

TABLE 24

| | 1.5-fold elongation (surface area ratio) | | | |
|---|---|---|---|---|
| | After heat resistance testing | | After water resistance testing | |
| Structure | Adhesion force | Adhesion | Adhesion force | Adhesion |
| PP structure 1 (film 8-1/no primer) | 20.5 | 100 | 18.8 | 100 |
| PP structure 2 (film 8-2/primer A) | 18.8 | 100 | 16.7 | 100 |
| PP structure 3 (film 8-3/primer B) | 20.5 | 100 | 20.0 | 100 |
| PP structure 4 (film 8-4/primer C) | 19.7 | 100 | 18.5 | 100 |

What is claimed is:

1. A decorative sheet comprising a surface layer and an adhesive layer, wherein the surface layer is formed by coating a crosslinked polyurethane resin on a surface and drying the crosslinked polyurethane resin; wherein the crosslinked polyurethane resin is obtained by crosslinking a straight chain polyurethane resin using 0.1 to 2.0 equivalents of a curing agent per acid of carboxyl groups in the polyurethane resin; the straight chain polyurethane resin is a reaction product of a polyurethane prepolymer and a diamine chain extender agent, the polyurethane prepolymer being a reaction product of a polycarbonate diol having an alicyclic structure, an aliphatic diol having a carboxyl group, and an isocyanate including 4,4'-dicyclohexylmethane diisocyanate; and the straight chain polyurethane resin has a molecular weight in the range of from about 50,000 to about 550,000 and an acid value in the range of from about 20.0 to about 30.0 mg.KOH/g.

2. The decorative sheet according to claim 1, wherein the polyurethane layer is substantially free of plasticizers.

3. The decorative sheet according to claim 1, wherein relationship between the acid value and the molecular weight of the straight chain polyurethane resin, as indicated by the value of the below formula (1), is less than or equal to 25:

$$[(300{,}000 - \text{molecular weight})/50{,}000]^2 + (\text{acid value} - 25)^2 \qquad (1).$$

4. The decorative sheet according to claim 1, further comprising a design layer.

5. The decorative sheet according to claim 4, wherein the design layer is a metal thin film layer.

6. The decorative sheet according to claim 5, wherein the metal thin film layer is an indium vapor-deposited layer.

7. The decorative sheet according to claim 1, wherein material of the adhesive layer is selected from the group consisting of acrylic, polyurethane, polyester, polyamide, ABS, polyolefin, and PVC.

8. The decorative sheet according to claim 1, further comprising a bonding layer.

9. The decorative sheet according to claim 8, wherein the bonding layer includes a resin selected from the group consisting of acrylic, polyurethane, polyester, and polyamide.

10. The decorative sheet according to claim 9, wherein the bonding layer further comprises silicone or a silane coupling agent.

11. The decorative sheet according to claim 8, further comprising a design layer, wherein the bonding layer is on the design layer.

12. A structure formed by thermoforming or coextruding a substrate and the decorative sheet described in claim 1.

13. A method of making a decorative sheet comprising a surface layer and an adhesive layer, the method comprising coating a crosslinked polyurethane resin onto a surface, and drying the crosslinked polyurethane resin to form the surface layer; wherein the crosslinked polyurethane resin is obtained by crosslinking a straight chain polyurethane resin using 0.1 to 2.0 equivalents of a curing agent per acid of carboxyl groups in the polyurethane resin; the straight chain polyurethane resin is a reaction product of a polyurethane prepolymer and a diamine chain extender agent, the polyurethane prepolymer being a reaction product of a polycarbonate diol having an alicyclic structure, an aliphatic diol having a carboxyl group, and an isocyanate including 4,4'-dicyclohexylmethane diisocyanate; and the straight chain polyurethane resin has a molecular weight in the range of from about 50,000 to about 350,000 and an acid value in the range of from about 20.0 to about 30.0 mg.KOH/g;

crosslinking the straight chain polyurethane resin using 0.1 to 2.0 equivalents of a curing agent per acid value of carboxyl groups;

coating the crosslinked straight chain polyurethane resin on a surface; and drying the coated crosslinked straight chain polyurethane resin.

14. The method according to claim 13, wherein the surface is a liner.

* * * * *

UNITED STATES PATENT AND TRADEMARK OFFICE
CERTIFICATE OF CORRECTION

PATENT NO. : 9,695,338 B2  
APPLICATION NO. : 14/400078  
DATED : July 4, 2017  
INVENTOR(S) : Ken Egashira Page 1 of 1

It is certified that error appears in the above-identified patent and that said Letters Patent is hereby corrected as shown below:

Column 13  
Line 5, delete "Laver/" and insert -- Layer/ --, therefor.

Column 28  
Lines 12-19, in Claim 13, delete "mg.KOH/g; crosslinking the straight chain polyurethane resin using 0.1 to 2.0 equivalents of a curing agent per acid value of carboxyl groups; coating the crosslinked straight chain polyurethane resin on a surface; and drying the coated crosslinked straight chain polyurethane resin." and insert -- mg.KOH/g. --, therefor.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*